United States Patent
Handlin, Jr. et al.

(10) Patent No.: US 9,963,585 B2
(45) Date of Patent: May 8, 2018

(54) POLYMER COMPOSITION AND COMPOUND THEREFROM FOR ISOTROPIC FILM, EXTRUDED AND MOLDED ARTICLE

(71) Applicant: TSRC Corporation, Taipei (TW)

(72) Inventors: Dale Lee Handlin, Jr., Charlotte, NC (US); Chun Yu Cheng, Taipei (TW)

(73) Assignee: TSRC Corporation, Taipei (TW)

( * ) Notice: Subject to any disclaimer, the term of this patent is extended or adjusted under 35 U.S.C. 154(b) by 109 days.

(21) Appl. No.: 14/808,920

(22) Filed: Jul. 24, 2015

(65) Prior Publication Data

US 2016/0032096 A1 Feb. 4, 2016

Related U.S. Application Data

(60) Provisional application No. 62/031,034, filed on Jul. 30, 2014.

(51) Int. Cl.
| | | |
|---|---|---|
| *C08L 53/02* | (2006.01) | |
| *C09D 153/02* | (2006.01) | |
| *C08L 23/04* | (2006.01) | |
| *C08L 91/00* | (2006.01) | |
| *C08K 3/26* | (2006.01) | |

(52) U.S. Cl.
CPC ............. *C08L 53/025* (2013.01); *C08L 23/04* (2013.01); *C08L 91/00* (2013.01); *C09D 153/025* (2013.01); *C08K 2003/265* (2013.01)

(58) Field of Classification Search
CPC .................... C08L 53/025; C08D 153/025
See application file for complete search history.

(56) References Cited

U.S. PATENT DOCUMENTS

| | | | |
|---|---|---|---|
| 5,364,669 A * | 11/1994 | Sumida ............... B32B 27/08 | 428/1.5 |
| 5,705,556 A | 1/1998 | Dijauw | |
| 6,239,218 B1 * | 5/2001 | Yonezawa ............ C08F 297/04 | 525/250 |
| 6,310,138 B1 | 10/2001 | Yonezawa | |
| 7,268,184 B2 | 9/2007 | Joly | |
| 2003/0166776 A1 * | 9/2003 | Wright ................ C08F 287/00 | 525/88 |
| 2003/0225209 A1 | 12/2003 | Handlin, Jr. | |
| 2005/0197465 A1 * | 9/2005 | Handlin, Jr. ......... C08F 297/04 | 525/314 |
| 2007/0020473 A1 * | 1/2007 | Umana ................ B32B 27/30 | 428/517 |
| 2011/0262686 A1 * | 10/2011 | Wright ................. C08L 53/025 | 428/114 |

* cited by examiner

*Primary Examiner* — Mark S Kaucher
(74) *Attorney, Agent, or Firm* — Snell & Wilmer L.L.P.

(57) ABSTRACT

The present invention provides polymer compositions containing a block copolymer having a formula A-B-A, wherein the block A is a vinyl aromatic block and the block B is a hydrogenated conjugated diene block, and compounds made from the polymer compositions. The block copolymer exhibits excellent flow characteristics, which allow it to be molded or extruded to isotropic articles. The present invention also provides films and molded articles therefrom.

12 Claims, No Drawings

POLYMER COMPOSITION AND COMPOUND THEREFROM FOR ISOTROPIC FILM, EXTRUDED AND MOLDED ARTICLE

CROSS REFERENCE TO RELATED APPLICATION

This application claims the right of priority based on U.S. Provisional Application No. 62/031,034 entitled "POLYMERS AND COMPOUNDS THEREFROM FOR ISOTROPIC EXTRUDED AND MOLDED GOODS," filed on Jul. 30, 2014, which is incorporated herein by reference and assigned to the assignee hereof.

FIELD OF INVENTION

The present invention relates to polymer compositions and compounds, and more particularly to the polymer compositions containing hydrogenation block copolymers and compounds from the polymer compositions. The present invention also includes the applications of such polymer composition, such as films, fibers and molded articles.

BACKGROUND OF THE INVENTION

Hydrogenated block copolymers are highly valued for applications in films/fibers or molded articles by way of forming processes such as injection molding, blow molding, film extrusion, fiber extrusion, film blowing and others. Hydrogenated block copolymers have the advantage of allowing complete recyclability of scrap and used articles. The applications come from a variety of polymer compositions containing hydrogenated block copolymer and other materials. Unfortunately, the conventional polymer compositions often are difficult to be processed due to the significant difference of the rheology and tensile properties in different orientations. This results in highly oriented articles which may warp or exhibit properties difficult to predict. It also makes the injection molding of thin walled parts, films and fibers difficult or impossible. Prior art documents, for example, U.S. Pat. No. 5,705,556, U.S. Pat. No. 6,310,138, U.S. Pat. No. 7,439,301, US 2011/0262686, U.S. Pat. No. 7,268,184, etc., mainly disclose such conventional polymer compositions, which all lack the study of required rheology and tensile properties, and thus fail to provide solutions for the high orientation problems. Therefore, there is a need for providing a polymer composition containing hydrogenated block copolymer and having good performance characteristics to solve the problems in the prior art.

SUMMARY OF THE INVENTION

The present invention provides polymer compositions containing an elastomeric hydrogenated block copolymer with excellent isotropic rheology and tensile characteristics, which allows them to be molded or extruded to goods with a wide variety of processes, so as to yield articles with little orientation anisotropy. This allows production of complex moldings, extrusions, films and fibers that would otherwise be difficult or impossible.

One aspect of the present invention is to provide a polymer composition comprising: (a) a block copolymer having a formula A-B-A having molecular weight of 70,000 to 120,000, a bond vinyl aromatic content from 16% to 20% by weight of the block copolymer; and a vinyl bond content from 32% to 42% by weight of the block B, the block copolymer exhibiting an order-disorder temperature (ODT) from 210° C. to 250° C. and a melt flow index (MFI) from 3 g/10 min to 12 g/10 min, wherein the block A is a vinyl aromatic block having molecular weight of 5,000 to 7,000; and the block B is a hydrogenated conjugated diene block having at least 90% hydrogenation degree; and
(b) one selected from the group consisting of: 5 to 40 weight % of a polyolefin homopolymer; 5 to 80 weight % of an polyolefin interpolymer; and an inorganic filler, wherein the weight % is based on the total weight of the polymer composition.

Another aspect of the present invention is to provide a film made from a polymer composition, the polymer composition comprising: (a) a block copolymer having a formula A-B-A, wherein the block A is a vinyl aromatic block; the block B is a hydrogenated conjugated diene block having at least 90% hydrogenation degree; and (b) one selected from the group consisting of: 5 to 40 weight % of a polyolefin homopolymer; and 5 to 80 weight % of an polyolefin interpolymer, wherein the weight % is based on the total weight of the polymer composition, wherein the film exhibits a hysteresis set anisotropy less than 25%, the hysteresis set anisotropy being obtained by selecting the smaller ratio from a ratio of a hysteresis set difference to a MD hysteresis set measured after 200% strain and a ratio of the hysteresis set difference to a TD hysteresis set measured after 200% strain, wherein the hysteresis set difference is an interval between the MD hysteresis set and the TD hysteresis set.

Another aspect of the present invention is to provide a molded article made from the polymer composition, the polymer composition comprising: (a) a block copolymer having a formula A-B-A having molecular weight of 70,000 to 120,000, a bond vinyl aromatic content from 16% to 20% by weight of the block copolymer; and a vinyl bond content from 32% to 42% by weight of the block B, the block copolymer exhibiting an order-disorder temperature (ODT) from 210° C. to 250° C. and a melt flow index (MFI) from 3 g/10 min to 12 g/10 min, wherein the block A is a vinyl aromatic block having molecular weight of 5,000 to 7,000; and the block B is a hydrogenated conjugated diene block having at least 90% hydrogenation degree; and (b) one selected from the group consisting of: 5 to 40 weight % of a polyolefin homopolymer; 5 to 80 weight % of an polyolefin interpolymer; and an inorganic filler, wherein the weight % is based on the total weight of the polymer composition.

Still another aspect of the present invention is to provide a molded article made by compression molding a compound obtained from the polymer composition containing (b) of less than 70 weight % of the inorganic filler, wherein the molded article exhibits an energy consumption in motor current from 35 amps to 50 amps during compounding of the polymer composition while the molded articles keeps an elongation at break in a good condition ranged between 455% to 545%. A further aspect of the present invention is to provide a block copolymer, comprising: a formula A-B-A having molecular weight of 70,000 to 120,000, wherein the block A is a vinyl aromatic block having molecular weight of 5,000 to 7,000 and the block B is a hydrogenated conjugated diene block having at least 90% hydrogenation degree; a bond vinyl aromatic content from 16% to 20% by weight of the block copolymer; and a vinyl bond content from 32% to 42% by weight of the block B, the block copolymer exhibiting an order-disorder temperature (ODT) from 210° C. to 250° C. and a melt flow index (MFI) from 3 g/10 min to 12 g/10 min. Still a further aspect of the present invention is to provide a fiber made from a polymer composition as aforementioned.

Other aspects and various embodiments included in the present invention to solve other problems and combined with the above aspects are disclosed in the following detailed descriptions.

DETAILED DESCRIPTION OF THE INVENTION

The preferred embodiments of the present invention will now be described in greater details. Descriptions of well-known components, materials and process techniques may be omitted so as to not unnecessarily obscure the embodiments of the invention. The present invention is described with reference to the illustrative embodiments; these descriptions should not be construed in a limiting sense. Various modifications of the illustrative embodiments, as well as other embodiments of the invention, will be apparent upon reference to these descriptions. It is therefore contemplated that the appended claims will cover any such modifications or embodiments as falling within the true scope of the invention and its legal equivalents.

Property Measuring Methods

Molecular weight used in the present invention is weight average molecular weight (Mw) determined by gel permeation chromatography (GPC), which is well known in the art.

Molecular weight distribution (MWD) used in the present invention is Mw/Mn. Mw is weight average molecular weight and Mn is number-average molecular weight. Both are determined by gel permeation chromatography (GPC). The method of determination can refer to common knowledge in the art.

Hydrogenation degree, bond vinyl aromatic content (BS, %) and vinyl bond content (Vinyl, %) used in the present invention are determined by FT-IR spectrophotometer. The method of determination can refer to common knowledge in the art.

Melt flow index (MFI, g/10 min at 230° C. 2.16 kg) number used in the present invention is measured according to ASTM D1238 standard.

Order-disorder temperature (ODT, ° C.) used in the present invention is determined by Dynamic Mechanical Analysis (DMA) using a TA Instruments ARES-II, which is well known in the art.

Tensile strength at break (Tb, Mpa) is measured according to ASTM D412 standard.

Elongation at break (Eb, %) used in the present invention is measured according to ASTM D412 standard.

Hysteresis properties are determined by 200% strain hysteresis test. During the hysteresis test, one 1 inch wide and 6 inch long strip is cut from the elastic film and elongated to 200% strain based on a 1-inch gage length at a crosshead speed of 10 in/min. After reaching the maximum strain, the specimen is immediately returned to 0 load also at a crosshead speed of 10 in/min. Following this cycle, the permanent set is calculated as the % strain at 0 load. Recovered energy is calculated at the area under the loading curve minus the area under the unloading curve divided by the area under the loading curve and is expressed in %.

Energy consumption in motor current (amps) is measured on a twin-screw extruder with the same screw speed and temperature by compounding of the polymer compositions therein. The twin-screw extruder is Sino Alloy, Model PSM30. Other details about the twin-screw extruder are: Screw diameter, 30 mm; Process length, 1150 mm; L/d, 38; Do/Di, 1.52; Barrel count, 9; Throughput, 4.5 Kg/hr; Screw speed, 220 rpm; Temperature 150° C. to 230° C.

The Block Copolymer

The block copolymer of the present invention has a formula of A-B-A. The block A is a vinyl aromatic block derived from a monomer selected from the group consisting of styrene, t-butyl styrene, methylstyrene and all isomers thereof, ethylstyrene and all isomers thereof, cyclohexylstyrene, vinyl biphenyl, 1-vinyl-5-hexyl naphthalene, vinyl naphthalene, vinyl anthracene and any combination thereof. Preferably, the block copolymer has molecular weight of 70,000 to 120,000, more preferably 80,000~110,000, even more preferably from 90,000~100,000. Preferably, the block A has a molecular weight of 5,000 to 7,000, more preferably of 5,000 to 6,000. The block B is a hydrogenated conjugated diene block having hydrogenation degree of at least 90%, preferably not less than 95%, more preferable not less than 98%. The block B is derived from a monomer selected from the group consisting of 1,3-butadiene, 2,3-dimethyl-1,3-butadiene, 3-butyl-1,3-octadiene, isoprene, 1-methylbutadiene, 2-phenyl-1,3-butadiene and any combination thereof.

The block copolymer of the present invention further exhibits an order-disorder temperature (ODT) from 210° C. to 250° C., preferably from 210° C. to 240° C. and a melt flow index (MFI) from 3 g/10 min to 12 g/10 min, preferably from 4 g/10 min to 10 g/10 min, and more preferably from 6 g/10 min to 8 g/10 min. Preferably, the block copolymer has a bond vinyl aromatic content from 16% to 20%, more preferably from 17%-20%, even more preferably from 17% to 19%, by weight of the block copolymer; and a vinyl content from 32% to 42%, more preferably from 34% to 40%, even more preferably from 36% to 40% by weight of the block B.

Polymerization and Hydrogenation

In the present invention, the method for producing the block copolymer includes anionic polymerization and hydrogenation. During anionic polymerization, the preferable option is to use organic alkali metal compounds containing organic lithium as a catalytic initiator, thereby obtaining activated polymers after addition of selected monomers in a suitable solvent at a temperature within the range from 0° C. to 100° C. Carbon-lithium ion is contained in the ends of the molecular chains. Thus, after addition of monomers the polymerization then continues by growing the molecular chains. The specific examples of organolithium initiators include n-propyl lithium, isopropyl lithium, n-butyl lithium, sec-butyl lithium, tert-butyl lithium, amyl lithium, phenyl lithium, tolyl lithium, and the likes, preferably n-butyl lithium or sec-butyl lithium. The amount of organolithium initiators used during polymerization depends on the molecular weight of the polymer to be desirably obtained, usually based on the actual consumption amount of total monomers. The weight percent of the organolithium initiators is in a range from 0.05% to 15%. Methods for anionic polymerization can be found in such references as U.S. Pat. No. 4,039,593. Solvents suitable for polymerization include compounds, such as inert organic solvents, wherein the inert organic solvents do not involve in the polymerization reaction. Examples of such solvents include aliphatic hydrocarbon compounds such as butane, isobutane, n-pentane, isopentane, 2,2,4-trimethyl pentane, iso-hexane, n-hexane, iso-heptane, n-heptane, iso-octane and n-octane; or naphthenic family such as cyclohexane, methyl cyclohexane, ethyl cyclohexane, cyclopentane, cycloheptane, methyl cyclopentane; or aromatic compounds such as benzene, toluene, xylene, ethylbenzene, diethylbenzene and propylbenzene, wherein cyclohexane is preferred in the present invention.

Hydrogenation is followed after the polymerization. The methods known in the prior art and useful for preparing the hydrogenated block copolymers of the present invention involve the use of a suitable catalyst or catalyst precursor comprising titanium based catalyst systems, and a suitable reducing agent such as an aluminum alkyl and a suitable catalyst stabilizer such as phosphate group. In general, the hydrogenation is performed at a temperature ranged from 0° C. to 200° C. and at a hydrogen pressure ranged from 1 to 90 kg/cm$^2$. Catalyst concentrations within the range from about 10 ppm to about 200 ppm by weight of titanium-based catalyst on total solid content of polymer are generally used. Methods for preparing the hydrogenated block copolymers can be found in such references as U.S. Pat. No. 7,612,148.

Examples of the Block Polymer

An exemplary block copolymer S01 of the present invention is prepared by adding 42.10 kilograms of cyclohexane and 127 grams of THF to a 100-liter reactor. The reaction is initiated by adding 7.23 grams of NBL followed by 734 grams of styrene monomer. After the styrene polymerization is complete, 6.47 kilograms of butadiene are added. After the completion of the butadiene polymerization, 734 grams of styrene are added. After the styrene polymerization is complete, forming the SBS triblock copolymer, the polymer is terminated with methanol. 1000 g of the polymer solution of SBS tri-block copolymer prepared as above is transferred to a pressure-resistant hydrogenation vessel and maintained in the nitrogen atmosphere. 0.11 millimoles of stabilizer is dissolved in 10 ml of cyclohexane at room temperature, 0.055 millimoles of bis(cyclopentadienyl)titanium dichloride is dispersed in 10 ml of cyclohexane, and 0.33 millimoles of triisobutyl aluminum is dissolved in 10 ml of cyclohexane. The above solutions are added to the SBS triblock copolymer. Hydrogen is fed in under a pressure of 25 kg/cm$^2$ to undergo hydrogenation at 80° C. The triblock SBS is then hydrogenated until more than 90% of the butadiene double bonds had been saturated. The resultant polymer is then precipitated into water to form a crumb and dried. The current example and other examples S02, P01 and P02 of the present invention prepared in a similar manner are shown in Table 1. Table 1 also shows the properties of polymer 1 (SEBS) as a comparative example wherein the polymer 1 is also prepared in a similar manner as example S01 except the amount of NBL and monomers of butadiene and styrene are changed in order to obtain the properties as shown. In comparison to the examples of the present invention, polymer 1 shows a very low MFI and an undesired ODT over 350° C.

TABLE 1

Properties of the block copolymers A-B-A

| Example | S01 | S02 | P01 | P02 | Polymer 1 (Comparative Example) |
|---|---|---|---|---|---|
| Block A Mw | 5,730 | 5,550 | 5,355 | 5,450 | 10,000 |
| A-B-A Mw | 96,730 | 92,700 | 91,500 | 91,000 | 95,000 |
| Hydrogenation degree of block B, % | 99.2 | 98.9 | 97.9 | 97.8 | 97.6 |
| MWD | 1.02 | 1.02 | 1.02 | 1.02 | 1.02 |
| BS, % | 18.5 | 18.4 | 18.3 | 18.8 | 30.0 |
| Vinyl, % | 39.2 | 38.6 | 41.9 | 41.5 | 38.0 |
| MFI 230° C. 2.16 kg (g/10min) | 4.0 | 5.5 | 6.8 | 7.1 | <1 |
| ODT, ° C. | 240 | 230 | 210 | 210 | >350 |

Polymer Compositions

The polymer composition of the present invention includes the block copolymer as abovementioned and other materials. The other materials typically include other polymers, tackifying resins, extending oils, inorganic fillers, etc. Other polymer includes polystyrene and olefin elastomers. Polystyrenes include general-purpose polystyrene, crystal polystyrene, impact polystyrene and high styrene content block copolymers. Preferable examples of polystyrene useful in the present invention include general-purpose polystyrene GPPS Taitarex861D (available from Taita Chemical Company). The olefin elastomers useful in the practice of the present invention include both polyolefin homopolymers and polyolefin interpolymers. Examples of polyolefin homopolymers are the homopolymers of polyethylene and polypropylene, but not limiter thereto. Examples of the polyolefin interpolymers are the ethylene/α-olefin interpolymers and the propylene/α-olefin interpolymers (α-olefin is preferably a C3-20α-olefin, include propene, 1-butene, 4-methyl-1-pentene, 1-hexene, 1-octene, 1-decene, 1-dodecene, 1-tetradecene, 1-hexadecene, and 1-octadecene), but not limited thereto. Preferable examples of polyolefin homopolymers useful in the present invention include low density polyethylene (LDPE) wax (Epolene C-10). Preferable Examples of polyolefin interpolymers useful in the present invention include propylene based polymers (e.g. VISTAMAXX® polymers available from ExxonMobil Chemical Company); homogeneously branched, linear ethylene/α-olefin copolymers (e.g. TAFMER® by Mitsui Petrochemicals Company Limited); and olefin block copolymers (e.g., INFUSE® available from The Dow Chemical Company).

Tackifying resins include hydrogenated C5, C9 monomers wherein a mixed monomer resin is optional. Preferable examples of tackifying resins useful in the present invention include Regalrez 1126 (available from Eastman Chemical Company). Extending oil includes mineral oil such as white oils and other synthetic hydrocarbon oils. Preferable examples of mineral oil useful in the present invention include Primol 352 (available from Exxon Mobil Corporation). The fillers used in the practice of the present invention can be either solid inorganic fillers and/or solid organic fillers. Inorganic fillers are the preferred fillers for use. Preferred examples of inorganic fillers are talc, calcium carbonate, silica/glass, glass fibers, alumina, aluminum trihydroxide, magnesium hydroxide and titanium dioxide, and mixtures thereof are preferred. Preferred examples of organic filler useful in the present invention include calcium carbonate $CaCO_3$ (>98% $CaCO_3$, median particle size about 1.6 μm, L-15F, (available from Yeng Hsingh Coporation).

The present invention provides the polymer compositions with excellent rheology/tensile properties, which allow it to be compounded and further, pressed, molded or extruded to isotropic goods. The polymer compositions are made by blending the below ingredients which contain (a) the block copolymer as aforementioned; and (b) other materials selecting from below items (b-1), (b-2) and (b-3).

(b-1): 5 to 40 weight %, preferably 10 to 30 weight %, of the polyolefin homopolymer as aforementioned. Preferably, the polymer composition of (b-1) may further comprise (c) 0 to 20 weight % of polystyrene; (d) 0 to 25 weight % of a tackifying resin; and (e) 0 to 20 weight % of an extending oil.

(b-2): 5 to 80 weight % of the polyolefin interpolymer as aforementioned.

(b-3): 0 to 70 weight % of the inorganic filler as aforementioned,

The weight % mentioned in this present invention is all based on the total weight of the polymer composition. Examples of the polymer compositions with excellent rheology/tensile properties will be demonstrated of as below.

Applications

The polymer compositions of the present invention can be processed to fabricate articles by any suitable means known in the art. For example, they can be processed into films/fibers or sheets as one or more layers of a multi-layered structure by known processes, such as calendering, blowing, casting or co-extrusion. Injection molded, compression molded, extruded or blow molded parts can also be prepared from the polymer compositions of the present invention. Alternatively, the polymer compositions can be processed by profile extrusion processes to make articles, such as wire and cable coatings, pipe and tubing, gaskets, molded articles, and floorings. The extrudate can also be milled, chopped, granulated or pelletized.

Films/Fibers

A film made from the polymer compositions of the present invention exhibits isotropic extrusion properties. The anisotropy (%) is defined as follows.

$$\text{The } X \text{ anisotropy } (\%) = A\% = \frac{X \text{ difference}}{MD\ X} \text{ or } \frac{X \text{ difference}}{TD\ X}$$

wherein $X \text{ difference} = |MD\ X - TD\ X|$ $MD\ X = X$ measured in a machine direction $TD\ X = X$ measured in a transverse direction X is one of the group consisting of the hysteresis set measured after 200% strain, the hysteresis loss measured after 200% strain, the tensile strength at break and the elongation at break. Specifically, for one film of the present invention, a hysteresis set anisotropy is less than 25%, preferably less than 15%, more preferably less than 10%, even more preferably less than 5%. The hysteresis set anisotropy is obtained by selecting the smaller ratio from a ratio of a hysteresis set difference to a MD hysteresis set measured after 200% strain and a ratio of the hysteresis set difference to a TD hysteresis set measured after 200% strain. The hysteresis set difference is an interval between the MD hysteresis set and the TD hysteresis set. The aforementioned can be represented as follows. The hysteresis set anisotropy (%)=(hysteresis set difference/MD hysteresis set measured after 200% strain) or (hysteresis set difference/TD hysteresis set measured after 200% strain), wherein the hysteresis set difference=|MD hysteresis set-TD hysteresis set|.

Preferably, one film of the present invention further exhibits a hysteresis loss anisotropy less than 25%, preferably less than 15%, and more preferably less than 10%. The hysteresis loss anisotropy is obtained by selecting the smaller ratio from a ratio of a hysteresis loss difference to a MD hysteresis loss measured after 200% strain and a ratio of the hysteresis loss difference to a TD hysteresis loss measured after 200% strain. The hysteresis loss difference is an interval between the MD hysteresis loss and the TD hysteresis loss. The aforementioned can be represented as follows. The hysteresis loss anisotropy (%)=(hysteresis loss difference/MD hysteresis loss measured after 200% strain) or (hysteresis loss difference/TD hysteresis loss measured after 200% strain), wherein the hysteresis loss difference=|MD hysteresis loss-TD hysteresis loss|.

Preferably, one film of the present invention, wherein the polymer composition is (b-1), exhibits a tensile strength at break anisotropy less than 25%, preferably less than 15%, more preferably less than 10%. The tensile strength at break anisotropy is obtained by selecting the smaller ratio from a ratio of a tensile strength at break difference to a MD tensile strength at break and a ratio of the tensile strength at break difference to a TD tensile strength at break, wherein the tensile strength at break difference is an interval between the MD tensile strength at break and the TD tensile strength at break. The aforementioned can be represented as follows. The tensile strength at break anisotropy (%)=(tensile strength at break difference/MD tensile strength at break) or (tensile strength at break difference/TD tensile strength at break), wherein the tensile strength at break difference=|MD tensile strength at break-TD tensile strength at break|.

Preferably, one film of the present invention, wherein the polymer composition is (b-1), exhibits an elongation at break anisotropy less than 10%, preferably less than 5%. The elongation at break anisotropy is obtained by selecting the smaller ratio from a ratio of a elongation at break difference to a MD elongation at break and a ratio of the elongation at break difference to a TD elongation at break, wherein the elongation at break difference is an interval between the MD elongation at break and the TD elongation at break. The aforementioned can be represented as follows. The elongation at break anisotropy (%)=(elongation at break difference/MD elongation at break) or (elongation at break difference/TD elongation at break), wherein the elongation at break difference=|MD elongation at break-TD elongation at break|.

Preferably, one film of the present invention, wherein the polymer composition is (b-2), exhibits the hysteresis set anisotropy less than 15%, preferably less than 10%, more preferably less than 5%. More preferably, one another film of the present invention, wherein the polymer composition is (b-2), exhibits a hysteresis loss anisotropy less than 20%, preferably less than 10%, more preferably less than 5%.

The films/fibers of the present invention are made from the polymer compositions as abovementioned. Specifically, the polymer compositions can be compounded in a single or twin-screw extruder to form a compound. The compound can be optionally pelletized. Then the films/fibers are formed from the compound using a cast film/fiber line. To demonstrate a commercially viable process, the compounds are made from the polymer compositions as formulations listed in Tables 2 to 4 by processing at a temperature above the ODT. The films are then prepared from these compounds by extrusion casting. Properties of the films are listed in Tables 2 to 4, wherein the anisotropy of tensile and hysteresis properties between TD and MD directions are included. Further note that comparative examples of I, II and III are also shown in Table 2.

TABLE 2

Tensile properties from polymer compositions (b-1) by extrusion casting

| | Formulations | | | | | | | Tb, Mpa | | | Eb % | | |
|---|---|---|---|---|---|---|---|---|---|---|---|---|---|
| | SEBS, %[1] | SEBS, %[2] | TR, %[3] | LDPE wax, %[4] | PS, %[5] | Oil, %[6] | LDPE, %[7] | MD | TD | A %[8] | MD | TD | A %[8] |
| B | 95 | 0 | 5 | 0 | 0 | 0 | 0 | 29.735 | 24.345 | 18.1 | 441 | 462 | 4.5 |
| C | 90 | 0 | 10 | 0 | 0 | 0 | 0 | 20.035 | 18.059 | 9.9 | 408 | 441 | 7.5 |
| D | 85 | 0 | 15 | 0 | 0 | 0 | 0 | 19.959 | 23.202 | 14.0 | 463 | 463 | 0.0 |
| E | 80 | 0 | 15 | 0 | 5 | 0 | 0 | 30.472 | 27.808 | 8.7 | 445 | 458 | 2.8 |
| F | 80 | 0 | 10 | 0 | 10 | 0 | 0 | 32.399 | 29.323 | 9.5 | 460 | 449 | 2.4 |
| G | 90 | 0 | 0 | 10 | 0 | 0 | 0 | 22.639 | 17.83 | 21.2 | 454 | 416 | 8.4 |
| H | 80 | 0 | 0 | 20 | 0 | 0 | 0 | 30.037 | 29.782 | 0.8 | 454 | 451 | 0.7 |
| I | 70 | 0 | 0 | 30 | 0 | 0 | 0 | 36.262 | 33.977 | 6.3 | 478 | 523 | 8.6 |
| J | 70 | 0 | 0 | 25 | 5 | 0 | 0 | 42.21 | 39.011 | 7.6 | 467 | 490 | 4.7 |
| K | 70 | 0 | 10 | 20 | 0 | 0 | 0 | 24.225 | 18.7 | 22.8 | 420 | 454 | 8.1 |
| L | 75 | 0 | 15 | 10 | 0 | 0 | 0 | 32.377 | 28.824 | 11.0 | 465 | 470 | 1.1 |
| N | 95 | 0 | 0 | 0 | 0 | 5 | 0 | 15.229 | 19.095 | 20.2 | 388 | 400 | 3.0 |
| O | 90 | 0 | 0 | 0 | 0 | 10 | 0 | 22.567 | 24.382 | 7.4 | 500 | 526 | 4.9 |
| | | | | | Comparative Examples | | | | | | | | |
| I | 0 | 70 | 0 | 0 | 0 | 20 | 10 | 29.921 | 17.986 | 39.9 | 635 | 714 | 11.06 |
| II | 0 | 70 | 0 | 0 | 0 | 30 | 0 | 16.299 | 13.698 | 16.0 | 861 | 722 | 16.14 |
| III | 0 | 55 | 15 | 0 | 15 | 15 | 0 | 19.89 | 18.53 | 6.8 | 607 | 772 | 21.37 |

Note:
[1]Example S01
[2]Polymer 1
[3]Regalrez 1126
[4]Epolene C-10
[5]Taitarex 861D
[6]Primol 352
[7]Dow 6401
[8]Anisotropy Rate

TABLE 3

Hysteresis properties from polymer compositions (b-1) by extrusion casting

| | Formulations | | | | | Set after 200% Strain, | | | | | |
|---|---|---|---|---|---|---|---|---|---|---|---|
| | | | LDPE | | | Cycle 1, % | | | % Loss in Cycle 1 | | |
| | SEBS, %[1] | TR, %[2] | wax, %[3] | PS, %[4] | Oil, %[5] | MD | TD | A %[6] | MD | TD | A %[6] |
| B | 95 | 5 | 0 | 0 | 0 | 8.9 | 7 | 21.3 | 22.6 | 17.4 | 23.0 |
| C | 90 | 10 | 0 | 0 | 0 | 8.2 | 7.5 | 8.5 | 20.8 | 16.5 | 20.7 |
| D | 85 | 15 | 0 | 0 | 0 | 11.2 | 11 | 1.8 | 23.4 | 20.2 | 13.7 |
| E | 80 | 15 | 0 | 5 | 0 | 13.3 | 11.2 | 15.8 | 23.3 | 19.9 | 14.6 |
| F | 80 | 10 | 0 | 10 | 0 | 12.7 | 9.7 | 23.6 | 20.8 | 18.8 | 9.6 |
| G | 90 | 0 | 10 | 0 | 0 | 11.5 | 11.3 | 1.7 | 30 | 29.2 | 2.7 |
| H | 80 | 0 | 20 | 0 | 0 | 13.9 | 13.8 | 0.7 | 39.7 | 38.4 | 3.3 |
| I | 70 | 0 | 30 | 0 | 0 | 18.6 | 17.6 | 5.4 | 47.6 | 45.9 | 3.6 |
| J | 70 | 0 | 25 | 5 | 0 | 16.6 | 15.4 | 7.2 | 47.8 | 44 | 7.9 |
| K | 70 | 10 | 20 | 0 | 0 | 13.2 | 13.8 | 4.5 | 38.9 | 39.6 | 1.8 |
| L | 75 | 15 | 10 | 0 | 0 | 10 | 10.4 | 4.0 | 27.3 | 27.1 | 0.7 |
| N | 95 | 0 | 0 | 0 | 5 | 13.5 | 10.3 | 23.7 | 22.9 | 19.2 | 16.2 |
| O | 90 | 0 | 0 | 0 | 10 | 13.3 | 10.9 | 18.0 | 21.4 | 19.6 | 8.4 |

Note:
[1]Example S01
[2]Regalrez 1126
[3]Epolene C-10
[4]Taitarex 861D
[5]Primol 352
[6]Anisotropy Rate

TABLE 4

Hysteresis properties from polymer compositions (b-2) by extrusion casting

| | Formulations | | | | Set after 200% Strain, | | | | | |
| | SEBS, | | | | Cycle 1, % | | | % Loss in Cycle 1 | | |
| | %[1] | POP, %[2] | POE, %[3] | OBC, %[4] | MD | TD | A %[5] | MD | TD | A %[5] |
|---|---|---|---|---|---|---|---|---|---|---|
| P | 0 | 100 | 0 | 0 | 17.7 | 19.8 | 10.6 | 58.4 | 61.7 | 5.3 |
| Q | 20 | 80 | 0 | 0 | 15.1 | 15.7 | 3.8 | 47.2 | 50.1 | 5.8 |
| R | 50 | 50 | 0 | 0 | 13.2 | 14.4 | 8.3 | 38.9 | 40.7 | 4.4 |
| S | 80 | 20 | 0 | 0 | 8.8 | 9.7 | 9.3 | 27.7 | 23.6 | 17.4 |
| T | 0 | 0 | 100 | 0 | 14.2 | 15 | 5.3 | 48.4 | 53.6 | 9.7 |
| U | 20 | 0 | 80 | 0 | 14.6 | 13.7 | 6.6 | 42.3 | 45.7 | 7.4 |
| V | 50 | 0 | 50 | 0 | 10.5 | 10.7 | 1.9 | 32.3 | 35.4 | 8.8 |
| W | 80 | 0 | 20 | 0 | 9.7 | 10 | 3.0 | 26.1 | 27.3 | 4.4 |
| X | 0 | 0 | 0 | 100 | 17.8 | 19 | 6.3 | 59.4 | 60.3 | 1.5 |
| Y | 20 | 0 | 0 | 80 | 16.4 | 17.1 | 4.1 | 53.4 | 52.3 | 2.1 |
| Z | 50 | 0 | 0 | 50 | 10.4 | 11.7 | 11.1 | 43.7 | 40.3 | 7.8 |
| AA | 80 | 0 | 0 | 20 | 11.7 | 10.8 | 8.3 | 31.8 | 28.7 | 9.7 |

Note:
[1]Example S01
[2]Vistamaxx 6102
[3]Tafmer DF640
[4]Infuse 9500
[5]Anisotropy Rate Energy-Saving Consumption During Compounding Process The present invention further provides molded articles made from compounds using injection or compression molding, wherein the compounds are blends of the polymer compositions through extrusion as above mentioned. The molded articles can be made by injection or compression molding processes. Particularly, a molded article of the present invention surprisingly exhibits energy-saving properties during compounding of the block copolymer while remaining good elongation of the molded article. The molded article is preferably made from the polymer composition containing (b-3). Specifically, for molded articles of the present invention made from the polymer compositions (b-3) (i.e. with the inorganic filler from 0 weight % to about 70 weight %), the energy consumption in motor current (amps) is in the range of 35 amps to 50 amps during compounding process while the elongation at break maintains in the range of 450% to 550%. According to one embodiment, the present invention provides a molded article made from the polymer compositions containing the inorganic filler between 40 weight % to 60 weight %, wherein the molded article exhibits a reduced energy consumption in motor current of not more than 45 amps during compounding process while keeping an elongation at break more than 500%. According to one another embodiment, the present invention provides a molded article made from the polymer compositions containing the inorganic filler between 40 weight % to 50 weight % inorganic filler, wherein the molded article exhibits a reduced energy consumption in motor current of less than 45 amps during compounding process while keeping an elongation at break more than 540%.

Table 5 as below demonstrates examples of the molded articles made by two processes, which are compounding following by compression molding. The compounding condition is described as above and the compression molding device manufacturer is Hung Ta instrument company, HT-8122A model, where the properties of power consumption (A, amps), tensile strength at break (Tb, kgf/cm2) and elongation at break (Eb, %) are shown.

TABLE 5 properties of tensile strength at break, elongation at break and power consumption during compounding from polymer compositions (b-3) by compression molding

| Fillers content, | Example S01[1] with fillers | | | Comparative Examples 6152[2] with fillers | | | Comparative Examples 6150[3] with fillers | | |
| CaCO3 | | Molding | | | Molding | | | Molding | |
| Process Unit | Compounding A, amps | Tb, kgf/cm² | Eb, % | Compounding A, amps | Tb, kgf/cm² | Eb, % | Compounding A, amps | Tb, kgf/cm² | Eb, % |
|---|---|---|---|---|---|---|---|---|---|
| 0% | 36 | 174 | 522 | 43 | 253 | 527 | 48 | 260 | 514 |
| 40% | 38 | 125 | 542 | 46 | 182 | 552 | 53 | 137 | 465 |
| 50% | 41 | 92 | 543 | 48 | 133 | 494 | 58 | 149 | 490 |

TABLE 5-continued properties of tensile strength at break, elongation at break and power consumption during compounding from polymer compositions (b-3) by compression molding

| Fillers content, CaCO3 | Example S01[1] with fillers | | | Comparative Examples 6152[2] with fillers | | | Comparative Examples 6150[3] with fillers | | |
|---|---|---|---|---|---|---|---|---|---|
| | | Molding | | | Molding | | | Molding | |
| Process Unit | Compounding A, amps | Tb, kgf/cm² | Eb, % | Compounding A, amps | Tb, kgf/cm² | Eb, % | Compounding A, amps | Tb, kgf/cm² | Eb, % |
| 60% | 45 | 73 | 506 | 53 | 118 | 491 | 62 | 103 | 465 |
| 70% | 50 | 61 | 458 | 61 | 75 | 412 | — | — | — |

Note:
[1]Example S01
[2]Taipol SEBS 6152 (available from TSRC Corporation)
[3]Taipol SEBS 6150 (available from TSRC Corporation)

The experiments of Table 5 demonstrate below effects. When the fillers is 0 weight %, the molded article exhibits a reduced energy consumption in motor current lower than 40 amps, preferably lower than 38 amps during compounding process, while remaining Eb above 520% in relation to the comparative examples of 6152 having motor current up to 43 amps and of 6150 having motor current up to 48 amps. When the fillers is added between 0 to 40 weight %, the molded article exhibits a reduced energy consumption in motor current lower than 40 amps during compounding process while remaining Eb between 520% to 545% in relation to the comparative examples of 6152 having motor current up to 46 amps and of 6150 having motor current up to 53 amps. When the fillers is added between 40 weight % to 50 weight %, the molded article exhibits a reduced energy consumption in motor current around 40 amps during compounding process while remaining Eb between 540% to 545% in relation to the comparative examples of 6152 having motor current up to 48 amps and of 6150 having motor current up to 58 amps. When the fillers is added between 50 weight % to 60 weight %, the molded article exhibits a reduced energy consumption in motor current greater than 40 amps but no more than 45 amps during compounding process while remaining Eb between 500% to 543% in relation to the comparative examples of 6152 having motor current up to 53 amps and of 6150 having motor current up to 62 amps. When the fillers is added between 60 weight % to 70 weight %, the molded article exhibits a reduced energy consumption in motor current between 40 to 50 amps during compounding process while remaining Eb between 450% to 510% in relation to the comparative examples of 6152 having motor current up to 61 amps. Compounds from 6150 could not be prepared at 70 weight % filler because of excessive torque during compounding.

While the invention has been described by way of examples and in terms of preferred embodiments, it would be apparent to those skilled in the art to make various equivalent replacements, amendments and modifications in view of specification of the invention. Therefore, the scope of the appended claims should be accorded the broadest interpretation so as to encompass all such replacements, amendments and modifications without departing from the spirit and scope of the invention.

The invention claimed is:

1. A film made from a polymer composition, the polymer composition comprising:

(a) a block copolymer having a formula A-B-A, wherein the block A is a vinyl aromatic block; the block B is a hydrogenated conjugated diene block having at least 90% hydrogenation degree and a vinyl bond content from 32% to 42% by weight of the block B, and wherein the block copolymer exhibits a melt flow index (MFI) from 3 g/10 min to 12 g/10 min and has a bond vinyl aromatic content from 16% to 20% by weight of the block copolymer; and (b) one selected from the group consisting of: 5 to 40 weight % of a polyolefin homopolymer; and 5 to 80 weight % of an polyolefin interpolymer, wherein the weight % is based on the total weight of the polymer composition, wherein the film exhibits a hysteresis set anisotropy less than 15%, the hysteresis set anisotropy being obtained by selecting the smaller ratio from a ratio of a hysteresis set difference to a MD hysteresis set measured after 200% strain and a ratio of the hysteresis set difference to a TD hysteresis set measured after 200% strain, wherein the hysteresis set difference is an interval between the MD hysteresis set and the TD hysteresis set.

2. The film of claim 1, wherein the film further exhibits a hysteresis loss anisotropy less than less than 25%, the hysteresis loss anisotropy being obtained by selecting the smaller ratio from a ratio of a hysteresis loss difference to a MD hysteresis loss measured after 200% strain and a ratio of the hysteresis loss difference to a TD hysteresis loss measured after 200% strain, wherein the hysteresis loss difference is an interval between the MD hysteresis loss and the TD hysteresis loss.

3. The film of claim 1, wherein the (b) is the 5 to 40 weight % of the polyolefin homopolymer, and the film exhibits a tensile strength at break anisotropy less than 25%, the tensile strength at break anisotropy being obtained by selecting the smaller ratio from a ratio of a tensile strength at break difference to a MD tensile strength at break and a ratio of the tensile strength at break difference to a TD tensile strength at break, wherein the tensile strength at break difference is an interval between the MD tensile strength at break and the TD tensile strength at break.

4. The film of claim 1, wherein the (b) is the 5 to 40 weight % of the polyolefin homopolymer, the film further exhibits a elongation at break anisotropy less than 10%, the elongation at break anisotropy being obtained by selecting the smaller ratio from a ratio of a elongation at break difference to a MD elongation at break and a ratio of the elongation at break difference to a TD elongation at break, wherein the elongation at break difference is an interval between the MD elongation at break and the TD elongation at break.

5. The film of claim 3, wherein the polymer composition further comprising:
   (c) above 0 and less than about 20 weight % of a polystyrene;
   (d) above 0 and less than about 25 weight % of a tackifying resin; and
   (e) above 0 and less than about 20 weight % of an extending oil.

6. The film of claim 4, wherein the polymer composition further comprising:
   (c) above 0 and less than about 20 weight % of a polystyrene;
   (d) above 0 and less than about 25 weight % of a tackifying resin; and
   (e) above 0 and less than about 20 weight % of an extending oil.

7. The film of claim 1, wherein (b) is the 5 to 80 weight % of the polyolefin interpolymer.

8. The film of claim 7, wherein the film further exhibits a hysteresis loss anisotropy less than less than 20%, the hysteresis loss anisotropy being obtained by selecting the smaller ratio from a ratio of a hysteresis loss difference to a MD hysteresis loss measured after 200% strain and a ratio of the hysteresis loss difference to a TD hysteresis loss measured after 200% strain, wherein the hysteresis loss difference is an interval between the MD hysteresis loss and the TD hysteresis loss.

9. The film of claim 1, wherein the block copolymer exhibits an order-disorder temperature (ODT) from 210° C. to 250° C.

10. The film of claim 1, wherein the block copolymer has molecular weight of 70,000 to 120,000 and the block A has molecular weight of 5,000 to 7,000.

11. The film of claim 1, wherein the block A is derived from a monomer selected from the group consisting of styrene, methylstyrene and all isomers thereof, ethylstyrene and all isomers thereof, cyclohexylstyrene, vinyl biphenyl, 1-vinyl-5-hexyl naphthalene, vinyl naphthalene, vinyl anthracene and any combination thereof; and the block B is derived from a monomer selected from the group consisting of 1,3-butadiene, 2,3-dimethyl-1,3-butadiene, 3-butyl-1,3-octadiene, isoprene, 1-methylbutadiene, 2-phenyl-1,3-butadiene and any combination thereof.

12. A film made from a polymer composition, the polymer composition comprising:
   (a) a block copolymer having a formula A-B-A, wherein the block A is a vinyl aromatic block; the block B is a hydrogenated conjugated diene block having at least 90% hydrogenation degree and a vinyl bond content from 32% to 42% by weight of the block B, wherein the block copolymer exhibits an order-disorder temperature (ODT) from 210° C. to 250° C. and a melt flow index (MFI) from 3 g/10 min to 12 g/10 min; and
   (b) one selected from the group consisting of: 5 to 40 weight % of a polyolefin homopolymer; and 5 to 80 weight % of an polyolefin interpolymer, wherein the weight % is based on the total weight of the polymer composition,
   wherein the film exhibits a hysteresis set anisotropy less than 15%, the hysteresis set anisotropy being obtained by selecting the smaller ratio from a ratio of a hysteresis set difference to a MD hysteresis set measured after 200% strain and a ratio of the hysteresis set difference to a TD hysteresis set measured after 200% strain, wherein the hysteresis set difference is an interval between the MD hysteresis set and the TD hysteresis set.

* * * * *